United States Patent [19]

Gring

[11] 3,875,290

[45] Apr. 1, 1975

[54] PROCESS FOR PREPARING METAL HYDROGEN ION-EXCHANGED CRYSTALLINE ALUMINOSILICATES

[75] Inventor: John L. Gring, Homewood, Ill.

[73] Assignee: Atlantic Richfield Company, Philadelphia, Pa.

[22] Filed: May 25, 1970

[21] Appl. No.: 40,352

[52] U.S. Cl. .......................... 423/328, 252/455 Z
[51] Int. Cl. ............................................ C01b 33/28
[58] Field of Search ........................... 23/111–113; 252/455, 454, 458, 463, 465; 208/111

[56] References Cited
UNITED STATES PATENTS

| | | | |
|---|---|---|---|
| 2,971,904 | 2/1961 | Gladrow et al. ................. | 252/455 X |
| 3,236,762 | 2/1966 | Rabo et al. ..................... | 208/111 |
| 3,293,192 | 12/1966 | Maher et al. .................... | 23/111 X |
| 3,455,842 | 7/1969 | Cornelius et al. ................. | 252/455 |
| 3,508,867 | 4/1970 | Frilette et al. ................... | 23/111 |

*Primary Examiner*—Edward J. Meros
*Attorney, Agent, or Firm*—Frank J. Uxa

[57] ABSTRACT

Metal, hydrogen ion-exchanged aluminosilicates are prepared by a process comprising heating an aqueous slurry of a nitrogen compound which hydrolyzes slowly to form ammonia, a metal salt and an ammonium-exchanged crystalline aluminosilicate to allow the metal to precipitate within the lattice structure of the aluminosilicate, and subsequently calcining the aluminosilicate to remove ammonia and form a heat-stable metal, hydrogen ion-exchanged aluminosilicate. These aluminosilicates, having substantially enhanced thermal stability and catalytic activity, are useful to promote various acid-catalyzed, chemical reactions such as isomerization and cracking.

15 Claims, No Drawings

PROCESS FOR PREPARING METAL HYDROGEN ION-EXCHANGED CRYSTALLINE ALUMINOSILICATES

This invention relates to novel aluminosilicates and their preparation by an ion-exchange operation. More particularly, this invention is directed to the preparation at relatively low cost of aluminum, zirconium and chromium-exchanged crystalline aluminosilicate having enhanced thermal stability and catalytic activity. The novel aluminum, zirconium and chromium-exchanged aluminosilicates of this invention actively promote acid-catalyzed reactions of hydrocarbons such as isomerization, cracking, hydrocracking and alkylation.

In recent years, the use of ion-exchanged, crystalline aluminosilicates as catalytic materials in the petroleum and chemical industries for reactions of hydrocarbons such as hydrocracking, isomerization, cracking, etc., has become increasingly important. Numerous crystalline aluminosilicates, derived from both natural and synthetic materials, have been utilized to prepare catalytically-active, ion-exchanged crystalline aluminosilicates. Problems regarding thermal stability have, however, been attendant the use of such crystalline aluminosilicates in these high temperature reactions.

Both natural and synthetic crystalline aluminosilicates having pores of diameter in the range 6 to about 15 A and silica-to-alumina mole ratios of about 2 to 20 are useful in the exchange operation disclosed of this invention. Among such naturally-occurring crystalline aluminosilicates which can be exchanged by the process of this invention are, for example, faujasites and mordenite. The synthetic crystalline aluminosilicates, are generally prepared by precipitation from aqueous solutions of aluminum, silicon and alkali metal compounds, particularly salts and oxides. The precipitate is generally aged for one or more days to allow crystallization to occur. A general formula for many of these synthetic crystalline aluminosilicates is:

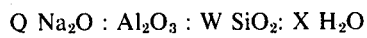

$$Q\ Na_2O : Al_2O_3 : W\ SiO_2 : X\ H_2O$$

in which Q is more than 0.2 but less than 1.1, W is from about 2 to 20 and X is up to about 9. Synthetic crystalline aluminosilicates sold commercially as "Zeolite Y" wherein Q has values of from 0.7 to 1.1 and W has values of from 4 to 5 are a preferred type. Preferred crystalline aluminosilicates have pores of relatively uniform size of about 8 to 15 A in diameter, and a silica-to-alumina mole ratio of about 3.5 to 6, more advantageously about 4 to 5. An example of the latter has a molar composition equivalent to 0.9–1.1 $Na_2O$ . $1Al_2O_3$ . 4 $SiO_2$ and the unit cell thereof is stated to be $Na_{64}.Al_{64}.Si_{128}O_{384}.216H_2O$. These aluminosilicates are three-dimensional, porous lattices having relatively good uniformity as indicated by X-ray diffraction patterns. However, until modified in some manner, such starting alkali metal-containing aluminosilicates are not normally useful in promoting acid-catalyzed reactions. Synthetic crystalline aluminosilicates useful in this invention may also be prepared by treatment of certain clays with aqueous caustic solution, followed normally by heat calcination to remove water. In some cases, these aluminosilicates are recombined with water before use.

Prior to accomplishing the process of this invention a finely divided alkali metal-containing crystalline aluminosilicate, which usually has a particle size of below about 15 microns, preferably below about 10 microns, may be combined with an aqueous solution of an ammonium compound, particularly salts such as ammonium nitrate, for example, to replace a substantial majority, more advantageously more than about 70 percent, of the initial alkali metal content with ammonium ions. Preferably more than about 90 percent, most preferably more than about 95 percent, of the initial alkali metal content is replaced. The replacement of a majority of the initial alkali metal with ammonium ions may be accomplished by carrying out the treatment with aqueous ammonium solution repeatedly to achieve adequate exchange. Alternatively, such an ammonium-exchanged crystalline aluminosilicate may be purchased commercially. Thus, the ammonium exchange itself does not comprise a necessary step in the invention herein.

The aluminum, zirconium and chromium-exchanged crystalline aluminosilicates of this invention having increased thermal stability and catalytic activity are prepared according to the following general scheme. The ammonium-exchanged aluminosiliate is treated with an aqueous solution containing urea or another nitrogen-containing compound which hydrolyzes slowly to form ammonia, and a water-soluble aluminum, zirconium or chromium salt to partially exchange a portion of the ammonium ions and probably a further portion of any remaining alkali metal content with the polyvalent metal ion, apparently in hydrated form. During this treatment, the aqueous slurry is heated, say, above about 75°F., preferably above about 150°F., to effect hydrolysis of the nitrogen compound; however, the temperature is usually below the boiling point of the solution. The hydrolysis results in a controlled increase in the alkalinity of the solution and precipitation within the lattice of the aluminosilicate of aluminum, zirconium or chromium ions, apparently as one or more hydrates of the metals. It is believed that the ammonia formed from the hydrolysis of urea or other substance forming ammonia slowly on hydrolysis, provides ammonium hydroxide which reacts stoichiometrically with the metal to precipitate the metal in its hydrated form in the lattice of the crystalline aluminosilicate. The metal apparently becomes exchanged into the crystalline aluminosilicate structure. This treatment adds a minor amount, normally about 0.5 to 15, preferably about 1 to 10, percent based on the total weight of the exchanged material (ignited weight basis), of metal in the lattice, and the solid phase can then be recovered by filtration, centrifugation and other known methods of liquid-solids separation. The amount of metals precipitated and apparently exchanged may even be greater than indicated provided the precipitation procedure is slow enough. Preferably, however, up to about 4 weight percent of aluminum, about 8 weight percent of chromium or about 10 weight percent of zirconium, based on the total exchange and on an ignited weight basis, is normally advantageous for improved thermal stability and catalytic activity. The recovered solid phase may be washed with an aqueous medium and dried, preferably at above about 220°F., to remove a large portion of the wash liquid.

The metal, ammonium ion exchanged aluminosilicate is then calcined, say, at a temperature of at least about 700°F. and preferably above about 900°F., up to about 1700°F., preferably up to about 1400°F., to decompose the ammonium ions present in the lattice.

This heating process releases ammonia, leaving hydrogen protons in the lattice. The ammonium decomposition process seems essentially complete after the temperature reaches about 900°F. During this heating step, a substantial portion of water, both in the lattice and apparently from the metals believed to be present in hydrated form, is also removed, but the treatment is not so severe that there is undue loss of crystallinity. The product is a metal, hydrogen ion (proton)-exchanged crystalline aluminosilicate having enhanced thermal stability and catalytic activity. After calcination the metals are believed to be present as their oxides.

Therefore, the necessary principle of operation of the procedure outlined above is to provide the nitrogen compound which hydrolyzes slowly to form ammonia and the metal salt in a heated aqueous slurry of the aluminosilicate and allow the metal, apparently as its hydrate, to affiliate by precipitation with the lattice structure of the aluminosilicate and then heat the aluminosilicate to calcination temperatures to remove ammonia and form protons, thus stabilizing the metal, hydrogen ion-exchanged product.

It is believed that the slow addition and precipitation of the metal ions allows the ions to be associated with points of lattice defects prior to precipitation as the hydrate, thus eventually providing increased thermal stability. Thus, it may be possible to use larger amounts of metals if the precipitation is sufficiently slow. Furthermore, it is significant to use urea or some other similar nitrogen compound such as water-soluble amines and amides such as hexamethylene tetramine and other such amines which hydrolyze slowly to form ammonia, as compared to use of ammonia itself or its salts. Example V indicates the significance of the use of such nitrogen-containing, hydrolyzable compounds rather than ammonia or an ammonium salt during the precipitation step.

The nitrogen containing compounds useful in this invention are thus those which hydrolyze to yield ammonia slowly enough that the nitrogen compound might be distributed homogeneously throughout the metal-exchange slurry before significant decomposition to ammonia takes place. Such slow, controlled hydrolysis (decomposition) of the nitrogen containing compound avoids localized high ammonia concentrations and concommitant reduced thermal stability of the final crystalline aluminosilicate. It has been determined that addition rates of the metal to the slurry of the crystalline aluminosilicates measured in terms of moles of metal (aluminum, zirconium or chromium) per gram of aluminosilicate on ignited basis, per minute should advantageously be less than about $1 \times 10^{-5}$, preferably less than about $5 \times 10^{-6}$, to achieve the improved thermal stability and catalytic activity contemplated herein.

The following examples of a non-limiting nature are included to indicate specific embodiments of the invention:

EXAMPLE I

In this example an ammonium-exchanged aluminosilicate is produced from a sodium aluminosilicate and ammonium nitrate reactants. In brief, ten exchanges were made, using Union Carbide Corporation "SK-40"[1] and ammonium nitrate, followed by water washings. In more detail, the procedure was as follows:

| Exchange No. | Water, Liters | $NH_4NO_3$ Grams | Grams "SK 40" | Approximate Heating Period | Maximum Temp. during Exchange °F. |
|---|---|---|---|---|---|
| 1 | 1.44 | 534 | 1016 | 1 Hr. | 167 |
| 2 | 1.0 | 280 | 1016 | 1 Hr. | 176 |
| 3 | 1.0 | 280 | 1016 | 1 Hr. | 173 |
| 4 | 1.0 | 280 | 1016 | 1 Hr. | 173 |
| 5 | 1.0 | 280 | 1016 | 1 Hr. | 177 |
| 6 | 0.5 | 140 | 508 | 1.4Hrs. | 178 |
| 7 | 0.5 | 140 | 508 | 1 Hr. | 185 |
| 8 | 0.5 | 140 | 508 | 1 Hr. | 185 |
| 9 | 0.5 | 140 | 508 | 1 Hr. | 183 |
| 10 | 0.5 | 140 | 508 | 1 Hr. | 179 |
| Plus water washings: | | | | | |
| 1 | 0.4 | None | 508 | 0.5 Hr. | 185 |
| 2 | 0.4 | None | 508 | 0.5 Hr. | 178 |
| 3 | 0.4 | None | 508 | 0.5 Hr. | 174 |

[1] Union Carbide "SK-40" is a faujusite type synthetic crystalline aluminosilicate in the sodium form having a pore diameter in the 10 to 15 A range and silica-alumina ratio of about 4.7 and having the following properties:

| | |
|---|---|
| wt.% silica | 63.5 |
| wt.% alumina | 23.5 |
| wt.% sodium oxide | 13.0 |
| surface area | 550 sq.m./gram |
| initial water content | — about 60 weight percent |
| average particle size | — about 5 microns |
| ultimate cyrstal size | — about 1 micron |

The filter cake was dried at 230°F. and processed to pass a 60 mesh (Tyler) sieve. The analysis was the following: 24.4 percent loss when heated to 1000°C., representing $NH_3$ and $H_2O$; 5.21 percent nitrogen, from ammonium radicals; 1.42 percent sodium; 10.3 percent aluminum, and 25.2 percent silicon. By calculating to a water-free basis, one finds 6.91 percent nitrogen from $NH_4+$, 1.88 percent Na, 13.6 percent Al, and 33.4 percent Si. The X-ray pattern indicated a very good retention of the lattice structure; i.e., sigma value[2] = 76.4 cms, compared to sigma value of about 80 cms for untreated "SK-40."

[2] Sigma value is the sum in cms. of peak heights determined by X-ray diffraction studies at a set of selected Bragg angles corresponding to the interplanar distances 5.7, 4.4, 3.76, 3.3, 2.85 and 2.63 A and is a measure of the retention of lattice structure and is thus directly related to the thermal stability of the crystalline aluminosilicate. The sigma value more specifically is the sum of the intensities of the above-mentioned diffraction lines represented by peak heights from the recorder.

EXAMPLE II

The product of this example is a preferred aluminum-hydrogen ion-exchanged crystalline aluminosilicate formed from aluminum added equivalent to about 2 percent by weight of added aluminum on an ignited basis.

The reactants were as follows:
  13.7 g. $Al(NO_3)_3 \cdot 9H_2O$
  50 g. Ammonium-exchanged aluminosilicate formed by the technique of Example I
  3.4 g. Urea; and, water The aluminosilicate had the following analysis:
  29.2 percent volatile at 1000°C., including $H_2O$ and $NH_3$ 4.2 percent nitrogen from NH$_4$+ radicals
1.1 percent sodium
9.76 percent aluminum The latter calculates to 13.8 percent aluminum on an ignited basis.

A Waring Blender was applied to distribute the ammonium-exchanged aluminosilicate in 0.35 liters of water, and then it was transferred to a tall-form Berzelins beaker. With rinse water, the total volume was close to 0.5 liters. The suspension was stirred and heated, while 0.2 liters of solution containing the aluminum nitrate and urea was added during 265 minutes, while the temperature was 184°–186°F. Digestion was continued for a total of 20 hours with an average temperature of about 191°F. Numerous increments of hot water were added to replace evaporation losses. The solid was separated by filtration and three washings with 0.15 liter of water applied. The washed material was dried at about 230°F. and processed to pass a 20 mesh (Tyler) sieve. The dried product upon analysis showed 15.8 percent aluminum on ignited basis. Thus, there was a gain of 2.0 percent by weight of aluminum on an ignited basis. Additionally, the rate of addition of aluminum (moles thereof) per gram of aluminosilicate on an ignited basis per minute for this Example is calculated at about $2.8 \times 10^{-6}$ moles Al+++/gram aluminosilicate/minute.

Part of the product was mixed with 4 percent flake graphite, then tabletted, broken, and sized to separate 10–14 mesh (Tyler) particles. These were heated in a temperature-programmed, air atmosphere, electric muffle for 5 hours at 900°F. The product had a sigma value of 43.7 cms., and a surface area of 825 sq.m. per gram. This product was found to have an outstanding activity to isomerize isobutane when compared to several other catalysts.

By heating part of the aluminum, hydrogen ion-exchanged product for 2 hours at 1350°F., an aluminum, hydrogen ion-exchanged product having a sigma value = 36.7, and a surface area = 740 sq. m/g was prepared.

EXAMPLE III

The product of this example is another closely related to that of Example II, but prepared with a shorter processing time and the use of NH$_4$OH after urea addition to raise the pH.

The reactants were as follows:
58.2 g. Al(NO$_3$)$_3$· 9H$_2$O
199 g. Ammonium-exchanged aluminosilicate formed by the technique of Example I
14.5 g. Urea; water; and 50 ml. 3M NH$_4$OH The aluminosilicate had the following analysis:
24.4 percent volatile at 1000°C., incl. H$_2$O and NH$_3$
5.2 percent nitrogen from NH$_4$+ radicals
1.4 percent sodium
10.3 percent aluminum The latter calculates to 13.7 percent aluminum on ignited basis.

A Waring Blender was applied to distribute the aluminosilicate in 0.5 liter of water. The suspension was rinsed into a 1.5 liter beaker; the total volume was about 0.7 liter. The suspension was continuously stirred and heated while 0.2 liter of solution containing 58.2 g. Al(NO$_3$)$_3$· 9H$_2$O and 14.5 g. of urea was added during 246 minutes, while the temperature was 172°–179°F. About 10 minutes before adding the last of the solution of Al+++ and urea, pH 3.5 was noted. 50 ml. total (portions = 15, 15 and 20 ml.) of about 3 M. NH$_4$OH were added to give pH 4. Stirring and digestion was continued for seven hours at an average of about 188°F. The solid was separated by filtration. The pH of the filtrate was close to 6. The solid was given three washings by the "Slurry-filter" method, using 0.3 liter of water in each instance. The resultant filter cake was dried in 230°F. oven. The aluminum addition of this Example calculated as about $3.0 \times 10^{-6}$ moles Al+++/gram of aluminosilicate/minute.

After 230°F. drying the sigma value by X-ray diffraction was 76.7 cms. A 900°F. calcined portion had a sigma value of 54, surface area of 826 sq.m./g., and an aluminum content of 15.8 percent on an ignited basis, thus showing 2.1 percent by weight increase in aluminum on an ignited basis; a 1350°F. calcined portion had a sigma value of 38.0 cms. by X-ray diffraction and a surface area of 853 sq. m./g.

Thus the products of Examples II and III had almost identical sigma values after 1350°F. calcination, with each showing retention of the crystalline structure and protons from the decomposition of exchanged ammonium groups.

EXAMPLE IV

This example was prepared with protons of the same reactants in the same ratios as for Example II, but with a variation in procedure planned to precipitate a higher ratio of the aluminum outside of the crystalline aluminosilicate particles. All reactants were together prior to initiation of heating.

The reactants were as follows:
5.8 g. Al(NO$_3$)$_3$·9H$_2$O
20 g. Ammonium-exchanged aluminosilicate formed by the techniques of Example I
1.5 g. Urea; and water The analysis of this aluminosilicate reactant is shown in Example III.

After dissolving the aluminum nitrate and urea in about 75 ml. water the solution was rinsed into a Waring Blender, and the total volume adjusted to about 0.25 liter. Into this solution was dispersed the crystalline aluminosilicate. The resultant suspension was rinsed into a tall-form Berzelins beaker and total volume adjusted to 0.4 liter. While stirring continuously, heating was effected. During 1 hour the temperature rose to 159°F. During the next hour, the temperature rose to 192°F. The temperature was maintained at about 194°–195°F. for 3 hours, then increased to about 207°F. during the next hour and a pH 5 was measured. The solid phase was separated by filtration, then washed by "slurry-filter" procedure with three portions of water, whose volumes were 0.05, 0.05, and 0.06 liter, respectively. The final cake was spread in a flat dish and placed for drying in a 230°F. oven. The dried product had a sigma value of 71.8 cms. by X-ray diffraction. After 900°F calcination in a programmed muffle, the product had a sigma value of 34.3 cms. Another portion calcined for 2 hours at 1350°F. had a sigma value equal to 19.8 cms. Thus, the product structure is less stable using this preparation compared to the preferred method of the invention. The placement of all the reactants together before heating thus forms a less preferred catalyst.

EXAMPLE V

This example indicates another preparation to precipitate, using ammonium hydroxide rather than urea, nearly all of the added aluminum on the exterior of the crystalline aluminosilicate particles, a large percentage of which are about one micron across. The crystalline aluminosilicate and aluminum nitrate applied were portions of the same stocks used for Example IV. In a preliminary trial, the ratio was determined for neutralization of 2.0 g. $Al(NO_3)_3 \cdot 9H_2O$ with about 3 molar $NH_4OH$, to give pH 7.

The reactants were as follows:
  5.8 g. $Al(NO_3)_3 \cdot 9H_2O$
  20 g. Ammonium-exchanged aluminosilicate formed by the technique of Example I
  20 ml. $NH_4OH$ solution about 3 molar and water The analysis of the aluminosilicate reactant is shown in Example III.

A Waring Blender was applied to disperse the aluminosilicate in about 300 ml. of water, and the suspension then rinsed into an 800 ml. beaker. Next added, while stirring, was the $NH_4OH$ solution. Next, an aqueous solution of the aluminum nitrate, totaling about 50 ml., was added to the stirred, ammoniacal suspension, using about 1 minute for the addition. After moderate stirring, the pH was 7–8. The reaction system was then heated with stirring. After 20 minutes 175°F. was attained at which stage filtration was started. Water washing was by "slurry-filter" sequence. The first two washings were with 100 ml. water and a third and fourth with 125 ml. water each. After sampling the cake for observation by the electron microscope, the balance was dried at 230°F. and processed to pass 60 mesh.

Portions of the oven dried product were calcined in an electric muffle with programmed temperature for 5 hours at 900°F. One portion was removed and the other portion was heated to 1350°F. and held for 2 hours before removing. Subsequent X-ray diffraction study disclosed that this method of adding aluminum does not yield a product having good thermal stability. The sigma-values from X-ray diffraction were:
  a. 75.8 cms. after oven drying
  b. 21.9 cms. after 900°F.
  c. 6.9 cms. after 1350°F.

A comparison of the sigma values of the products of Example IV and this example clearly indicates that the controlled hydrolysis of urea to form ammonia rather than the use of ammonia itself during the metal exchange process results in crystalline aluminosilicates of substantially improved thermal stability.

EXAMPLE VI

Three compositions having 1 percent Al, 4 percent Al and 6 percent Al added were prepared by a sequence of operations similar to those of Example III. During the preparation of the 4 percent-added-Al material, 15 ml. of 3 M $NH_4OH$ were added to moderately increase the pH. The addition was made one-half hour after the last of the solution containing urea and aluminum nitrate had been introduced; the pH change was from about 3.3 to 3.8.

In reference to Example III and the 4 percent Al preparation of Example VI, some $NH_4OH$ was used to adjust the pH moderately. This was done after a heating-aging period of substantial length and, therefore, does not make any significant change in the character of the alumina added. The corresponding rates of aluminum addition to the aluminosilicate slurry in this Example are about $2.3 \times 10^{-6}$, $7.9 \times 10^{-6}$ and $23 \times 10^{-6}$ moles of aluminum per gram of aluminosilicate per minute, respectively.

EXAMPLE VII

Prior to activity testing, small-particle products such as those of Example II were processed to larger, calcined particles. The oven-dried products were mixed with four weight percent of Superflake Graphite No. 590, (distributed by Superior Flake Graphite Co., Chicago) then tabletted to ⅜ inch D × 1/16 inch L, cracked and sized to 10–14 mesh (Tyler) range. Small portions were placed into porcelain crucibles and taken to 900°F. and held for 5 hours, using a temperature programmed electric muffle; i.e., 8 hours to 900°F., 5 hours at 900°F., and cooling to 400°F. and holding. The calcined portions were quickly transferred into vials.

Activity Test Method: 3 grams, on ignited basis, of catalyst were charged into a ⅜ inch I.D.S.S. microreactor, fitted with a thermocouple onto the outer surface of the catalyst bed for measuring temperature. A moderate stream of prepurified nitrogen was passed overnight at a temperature of 950°F. as a preconditioning period. The feedstock used was 99.9 percent isobutane and 0.1 percent n-butane, checked by gas chromatography. The nitrogen flow was stopped, then isobutane feedstock started at a rate equal to 1.0 weight hourly space velocity, at one atmosphere pressure and 950°F. The products were routed so that samples could be directed into gas chromatographic equipment at intervals. Samples were analyzed to represent 5 mins., 30 mins., and 60 mins. "on stream." The chromatograph records were interpreted and calculated to give percent total conversion and percent isomerization. The aluminosilicate catalyst of Example II gave 66.21 percent total conversion and 31.28 percent isomerization.

EXAMPLE VIII

This example concerns a zirconium, hydrogen ion-exchanged aluminosilicate of this invention which has a high activity for cracking isobutane. A chromium exchanged aluminosilicate prepared by this method also had improved thermal stability and increased activity in hydrogenation reactions. The reactants were as follows:
  33.3 g. ammonium-exchanged aluminosilicate prepared by the technique of Example I
  3.4 g. urea
  16.0 ml. zirconium acetate solution having 165 mg. $ZrO_2$ equivalent per ml. and water The aluminosilicate had the following analysis:
  29.2 percent volatile at 1000°C., incl. $H_2O$ and $NH_3$
  4.2 percent nitrogen from $NH_4+$ radicals
  1.10 percent sodium
  9.74 percent aluminum The latter calculates to 13.8 percent aluminum on an ignited basis.

A Waring Blender was applied to blend 250 ml. water, 33.3 g. aluminosilicate, then 1.7 g. urea, followed by 8.0 ml. of the zirconium solution. The resultant slurry was stirred and heated gradually, rising from 83°F. to 191°F. during 3.3 hours. The temperature was held at 185°F. or above for the next hour and then the solution was covered and maintained at about 75°F.

ambient overnight. Later, the solid phase was resuspended by stirring and a solution of 1.7 g. urea in 10 ml. water, followed by 7 ml. rinse water were added. Some 15 minutes later, 8.0 ml. of zirconium acetate solution was added, bringing total volume to about 220–225 ml. While continuing stirring, heating was started. During 2.8 hours, the temperature was increased to 197°F. The slurry was maintained within 184°–202°F. during the next 3.3 hours, with about 195°F. average. The slurry was then placed for filtration in an M-frit Pyrex unit. Three water washings were applied to the filtered product using the "Slurry-filter" sequence with 100 ml. of water used for each of the three washes. After taking a sample for electron microscopy, the majority of the cake was placed for drying at 230°F. overnight. The dried product was examined by X-ray diffraction; sigma value = 61.2 cms. The pattern did not disclose a separate zirconia phase. An analysis for nitrogen content from ammonium radicals and possibly adsorbed urea disclosed 3.87 percent N. Then, 27 g. of the oven-dried product was well mixed with 1.2 g. of flake graphite, processed by the procedure indicated in the forepart of Example VII, resulting in 22.9 g. of 10–14 mesh size particles and calcined with 900°F. maximum. The resulting analysis included 8.35 percent volatile at 1000°C. The values for Na, Zr, Al, and Si calculated to the following molar ratio, on ignited basis: $0.11\ Na_2O \cdot 0.30\ ZrO_2 \cdot 1.0\ Al_2O_3 \cdot 3.4\ SiO_2$. The surface area was 628 sq.m./g. using "Brunnauer-Emmett-Teller" procedure. By X-ray diffraction, the sigma value = 30.4 cms.

This catalyst displayed an unusually high activity for cracking isobutane when checked by the procedure disclosed in Example VII. The conversion was measured at 97.96 percent, and 122.4 percent cracking (due to secondary cracking). Thus the procedure disclosed results indicating a zirconium-hydrogen ion-exchanged aluminosilicate of high cracking activity.

A portion of the zirconium, hydrogen ion-exchanged aluminosilicate was calcined to 1350°F. level, followed by X-ray determination of sigma value. The latter was equal to 15.0 cms. Thus, its thermal stability was better than a 1.0 to 4.0 percent added aluminum content aluminosilicate.

Table I summarizes the above Examples I to VI.

I claim:

1. A process for preparing metal, hydrogen ion-exchanged crystalline aluminosilicates wherein the metal is selected from the group consisting of aluminum, zirconium and chromium, comprising heating an aqueous slurry of a nitrogen compound forming ammonia on hydrolysis and a water-soluble salt of said metal with a predominantly ammonium-exchanged crystalline aluminosilicate having pores of diameter of about 6A to 15A and a silica-to-alumina mole ratio of about 2 to 20:1 to allow the metal to precipitate within the lattice structure of the aluminosilicate; and calcining the resulting material to form a metal, hydrogen ion-exchanged crystalline aluminosilicate, said process adding about 0.5 to 15 percent by weight of said metal based upon the total weight of the aluminosilicate on an ignited basis.

2. A process according to claim 1 wherein the metal is aluminum.

3. A process of claim 1 wherein the ammonia-forming compound is urea.

4. A process according to claim 1 further including the step of replacing with ammonium ions at least about 70 percent by weight of the initial sodium content of the aluminosilicate prior to the metal precipitation.

5. A process according to claim 1 wherein from about 0.5 to 10 weight percent of said metal is added.

6. A process according to claim 1 wherein the metal is aluminum present from about 1.5 to 4 weight percent as said added metal.

7. A process according to claim 1 wherein during metal precipitation the aqueous, heated slurry is maintained at above about 150°F.

8. A process according to claim 1 wherein the aluminosilicate is a crystalline aluminosilicate having pores of a diameter of about 8 to 15 A and a silica-to-alumina mole ratio of about 3.5 to 6:1.

9. A process according to claim 8 wherein the crystalline aluminosilicate has a silica-to-alumina mole ratio of about 4 to 5:1.

10. A process according to claim 1 wherein the rate of adding the metal to the slurry is less than about $1 \times 10^{-5}$ moles of metal per gram of aluminosilicate per

TABLE I minute.

11. A process for preparing metal, hydrogen ion-exchanged crystalline aluminosilicates, wherein the metal is selected from the group consisting of aluminum, zirconium and chromium and the aluminosilicate has pores of diameter of from about 8 to 15 A and a silica-to-alumina mole ratio of about 3.5 to 6:1, comprising forming an aqueous slurry of urea and a water-soluble salt of said metal with a predominantly ammonium-exchanged aluminosilicate and heating to above about 150°F. to allow the metal to precipitate within the lattice structure of the aluminosilicate; and calcining to form a metal, hydrogen ion-exchanged crystalline aluminosilicate, said process adding from about 1 to 10 percent by weight of said metal based upon the total weight of the aluminosilicate on an ignited basis.

12. A process according to claim 11 wherein about 1.5 to 4.0 percent by weight of aluminum is added.

13. A process according to claim 11 further including the step of replacing with ammonium ions at least about 90 percent by weight of the initial sodium content of the aluminosilicate prior to the metal precipitation.

14. A process according to claim 11 wherein the crystalline aluminosilicate has a silica-to-alumina mole ratio of about 4 to 5:1.

15. A process according to claim 11 wherein the rate of addition of the metal to the slurry is less than about $5 \times 10^{-6}$ moles of metal per gram of aluminosilicate per minute.

* * * * *